United States Patent
Al Sayeed et al.

(10) Patent No.: US 9,252,913 B2
(45) Date of Patent: Feb. 2, 2016

(54) SYSTEMS AND METHODS FOR OPTICAL DARK SECTION CONDITIONING

(71) Applicant: Ciena Corporation, Hanover, MD (US)

(72) Inventors: Choudhury A. Al Sayeed, Gloucester (CA); David Miedema, Ottawa (CA); Loren S. Berg, Richmond (CA); Dave C. Bownass, Ottawa (CA)

(73) Assignee: Ciena Corporation, Hanover, MD (US)

( * ) Notice: Subject to any disclaimer, the term of this patent is extended or adjusted under 35 U.S.C. 154(b) by 291 days.

(21) Appl. No.: 13/887,942

(22) Filed: May 6, 2013

(65) Prior Publication Data

US 2014/0328583 A1    Nov. 6, 2014

(51) Int. Cl.
*H04B 10/077*    (2013.01)
*H04J 14/02*    (2006.01)
*H04B 10/293*    (2013.01)

(52) U.S. Cl.
CPC ........ *H04J 14/0289* (2013.01); *H04B 10/0777* (2013.01); *H04B 10/2935* (2013.01); *H04J 14/0202* (2013.01); *H04J 14/0221* (2013.01)

(58) Field of Classification Search
CPC ............. H04J 14/0202; H04J 14/0221; H04J 14/0227; H04J 14/0275; H04J 14/0201
See application file for complete search history.

(56) References Cited

U.S. PATENT DOCUMENTS

| | | | |
|---|---|---|---|
| 2004/0146306 A1* | 7/2004 | Muzicant et al. | 398/177 |
| 2004/0213566 A1* | 10/2004 | Takanashi et al. | 398/32 |
| 2005/0158057 A1* | 7/2005 | Tomofuji et al. | 398/160 |
| 2006/0126503 A1* | 6/2006 | Huck et al. | 370/225 |
| 2007/0223917 A1* | 9/2007 | Nagamine | 398/1 |
| 2008/0095537 A1* | 4/2008 | Sakamoto | 398/83 |

* cited by examiner

*Primary Examiner* — Eric Bolda
(74) *Attorney, Agent, or Firm* — Clements Bernard PLLC; Christopher L. Bernard; Lawrence A. Baratta, Jr.

(57) ABSTRACT

Embodiments of the disclosure are directed to optical dark section conditioning. An embodiment generates at least one of a broadband noise or signal at the head end of a section for a first module of the section; and operates all other modules of the section in gain control mode.

33 Claims, 8 Drawing Sheets

SYSTEMS AND METHODS FOR OPTICAL DARK SECTION CONDITIONING

BACKGROUND OF THE INVENTION

1. Field of the Invention

Embodiments of the disclosure are directed to monitoring dormant or out-of-service fiber optics for layer 0 restoration.

2. Description of the Related Art

Turning up wavelengths in an optical link, especially in a DWDM (dense wavelength division multiplexing) system, is becoming time critical in terms of layer 0 restoration schemes. Any potential link failures can delay the wavelength turn up and therefore delay or fail the overall layer 0 restoration with respect to time. Such optical link failures include, but are not limited to, optical line fails, line fiber cut, extended span loss reach in any span that can drive the next amplifier block, or EDFA (erbium doped fiber amplifier) to shutoff or in input loss of signal (LOS) state. It is possible to have high back reflection present on the line fiber that could severely impact the performance of the optical channels. It can also drive down the amplifier output power to a lower value by triggering, for example, the amplifier safety mechanisms (e.g., automatic power reduction mechanism or APR). Any of the line amplifiers, for example, can be manually set to out-of-service that can shutdown the amp causing severe service interruption on that link.

If these traffic interrupting link disturbances can be detected ahead of time for any optical link, that link can be avoided during the phase of layer 0 restoration. Traffic impacting link disturbances can be detected when links are already carrying some level of traffic channels.

If the link remains dark either in day 1 installation when the link is not carrying any traffic or after fixing link down related conditions (e.g. fiber cut) where all services were earlier moved due to link failures, traffic may be reverted back on the home path after fixing the fault points. If the link is not verified ahead of time, any restoration or reversion action triggered over the dark link may fail due to the above mentioned link imperfections.

SUMMARY

Embodiments of the disclosure are directed to methods, apparatuses, and non-transitory computer readable media for optical dark section conditioning, including: generating at least one of a broadband noise or signal at the head end of a section for a first module of the section; and operating all other modules of the section in gain control mode.

Some embodiments may include determining whether a section is dark. Some embodiments may also include closing all per channel actuators at a head end optical add drop multiplexer (OADM) node. Some embodiments may provide for closing down pixels in a wavelength selective switch. These embodiments may also include moving a per channel or group multiplexer variable optical attenuators to an approximate maximum attenuation.

Some embodiments may include masking an alarm raised by a first amplifier at the head of the section. In some embodiments, the target gain for the other modules is based on a span loss of a preceding span reported by an optical supervisory channel. In some embodiments, the gain for the other modules is substantially based on prior results. Some embodiments include setting gain targets for all modules in gain control mode. In some embodiments, a section head optical controller waits a predetermined amount of time in order to allow a first amplifier to achieve its output power target prior to setting the other modules in the section in gain control mode.

Some embodiments may include disabling an automatic shutoff mode for a first amplifier in a dark section; setting the first amplifier in power control mode; setting an estimated power target to bring a second amplifier in the section out of shutoff mode, wherein the second amplifier is the next amplifier in the set after the first amplifier; and setting all remaining amplifiers in the section in gain control mode.

Some embodiments may include performing optical dark section conditioning on more than one dark section. In some embodiments, the more than one dark section comprises at least one of the following: a route and select based network architecture and a broadcast and select-based architecture. Some embodiments may include performing optical dark section conditioning on a section that comprises at least one Raman amplifier. In some embodiments, at least one of the modules has a back-reflector photodiode on an output port to detect back-reflection coming into the port. Some embodiments may include at least one instruction to reduce output power in order not to damage the modules.

The present embodiments can turn up light in a dark optical section between two OADMs (optical add drop multiplexers) using system generated noise that (1) can allow detecting traffic impacting link disturbances, e.g. amplifier shutoff, high back reflections, optical line fail, and (2) can maintain the safety standards and prevent any damaging of the installed EDFA base in the DWDM line system. The embodiments can detect link perturbations without the presence of any traffic carrying channels, and can help the layer 0 control plane to avoid the faulted optical link or section ahead of time for any traffic restoration or reversion saving valuable time for restoration. The embodiments described can also reduce the wavelength turn up time significantly in a dark section compared to the conventional way where dark section add timings are limited by the sequential turn ups and gain settings for each AMP. The embodiments can use the system's commonly available photonic components without introducing any external or additional photonic hardware, and can be introduced for any dark optical sections in the network remotely without impacting services in any other links. The proposed DSC can allow detecting faults remotely in multiple end-to-end connected fiber spans in parallel while the system is fully active, functional and ready to enroll traffic at any point. DSC can also be applied when the links are not carrying any live traffic. The control plane can make decisions ahead of time based on DSC data to avoid enrolling traffic on a faulty link until the fault is cleared.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Data communication networks may include various computers, servers, nodes, routers, switches, bridges, hubs, proxies, and other network devices coupled to and configured to pass data to one another. These devices are referred to herein as "network elements" or "network devices." Data is communicated through the data communication network by passing protocol data units, such as Internet Protocol (IP) packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

A "dark section" is a section wherein all the amplifier blocks in the section remain in shutoff state due to loss of light (i.e., that no traffic carrying channels or wavelengths are present in the system).

Figure 1:
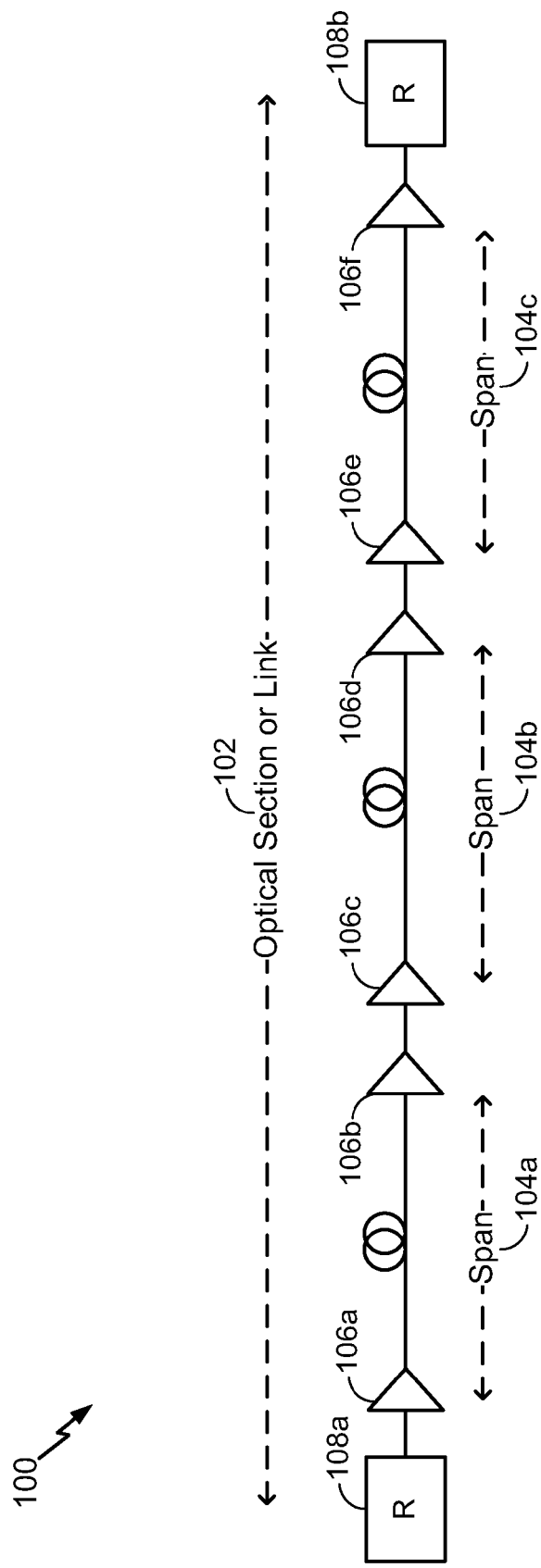
FIG. 1 illustrates an exemplary reconfigurable optical add drop multiplexer (ROADM)-based dense wave division multiplexing (DWDM) system.

FIG. 1 illustrates an exemplary reconfigurable optical add drop multiplexer-based DWDM system 100 that shows an optical section or link 102 that contains multiple stretched spans of optical fibers 104a, 104b, 104c amplified with erbium doped fiber amplifiers (EDFA) 106a, 106b, 106c, 106d, 106e, 106f between optical add drop multiplexers (OADM) 108a, 108b. The number of EDFAs 106a, 106b, 106c, 106d, 106e, 106f deployed per span 104a, 104b, 104c and their target gain and power settings can depend on the link budget requirement for that section. After the day 1 installation of the system, or following a maintenance window (for example fixing a fiber cut) where there is no traffic channels present, the optical section or link 102 can remain dark.

DSC can be used when a section head optical controller identifies that the optical section or link 102 is dark. DSC can place the first EDFA 106a in the first span 104a in power control mode providing a low enough power target to bring the next EDFA 106b in the optical section or link 102 to come out of shutoff, and then set the rest of the EDFAs 106c, 106d, 106e, 106f in the optical section or link 102 in gain control mode.

Setting the first EDFA 106a in power control mode to generate low power amplified spontaneous emission (ASE) can serve multiple purposes. First, it can check for faults (e.g. high back reflection) on the first EDFA 106a. Second, it can generate enough power from first EDFA 106a to keep the span 104a lit and perform fault detection for the next EDFA 106b in the optical section or link 102. All the other EDFAs 106c-106f are set at a target gain that can meet the section budget requirement for the optical section or link 102 and generate enough power to keep the optical section or link 102 lit end-to-end. Furthermore, by keeping the output power low at the first EDFA 106a, the risk of damaging the first EDFA 106a due to erbium concentration can be minimized in case of an accidental optical signal flow to the first EDFA input. Since all the other EDFAs 106b-f can run in gain control mode and their shutoff mechanism may not be disabled, they can safely shutoff as soon as the first EDFA 106a goes to shutoff. Hence, the risk of damaging all the other EDFAs 106b-f in the optical section or link 102 can be minimized as well.

Some EDFAs have built-in back-reflector photodiodes on the output port that can detect any amount of back-reflection coming to that port. If the amount of back reflection is too high, the EDFA output power can be reduced using Automatic Power Reduction (APR). This is a safety procedure followed in order not to damage the EDFAs. DSC can detect APR conditions leveraging built-in measurement points that cannot be achieved via external OTDR.

Figure 2A:
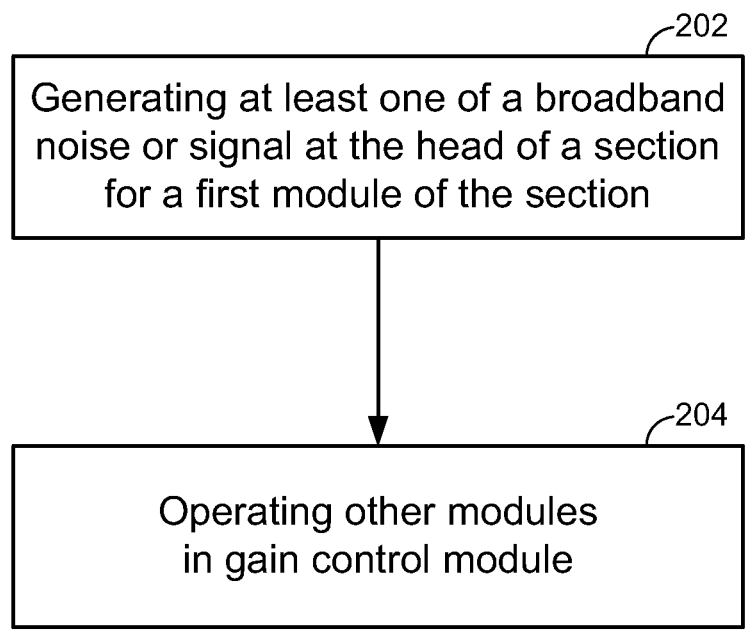
FIG. 2A illustrates an exemplary flow for detection using dark section conditioning (DSC).

FIG. 2A illustrates an exemplary flow for detection using DSC. At least one of a broadband noise or signal can be generated at the head end of the section using a system available optical component that is sufficient enough to turn up the next amplifier component in the section (202). Other modules in the section can operate in gain control mode (204). DSC can be implemented in various configurations. In some embodiments, the estimated power settings for the first AMP and gain settings for the other AMPs in the section can be done in parallel. In other embodiments, they can be done in sequence.

Figure 2B:
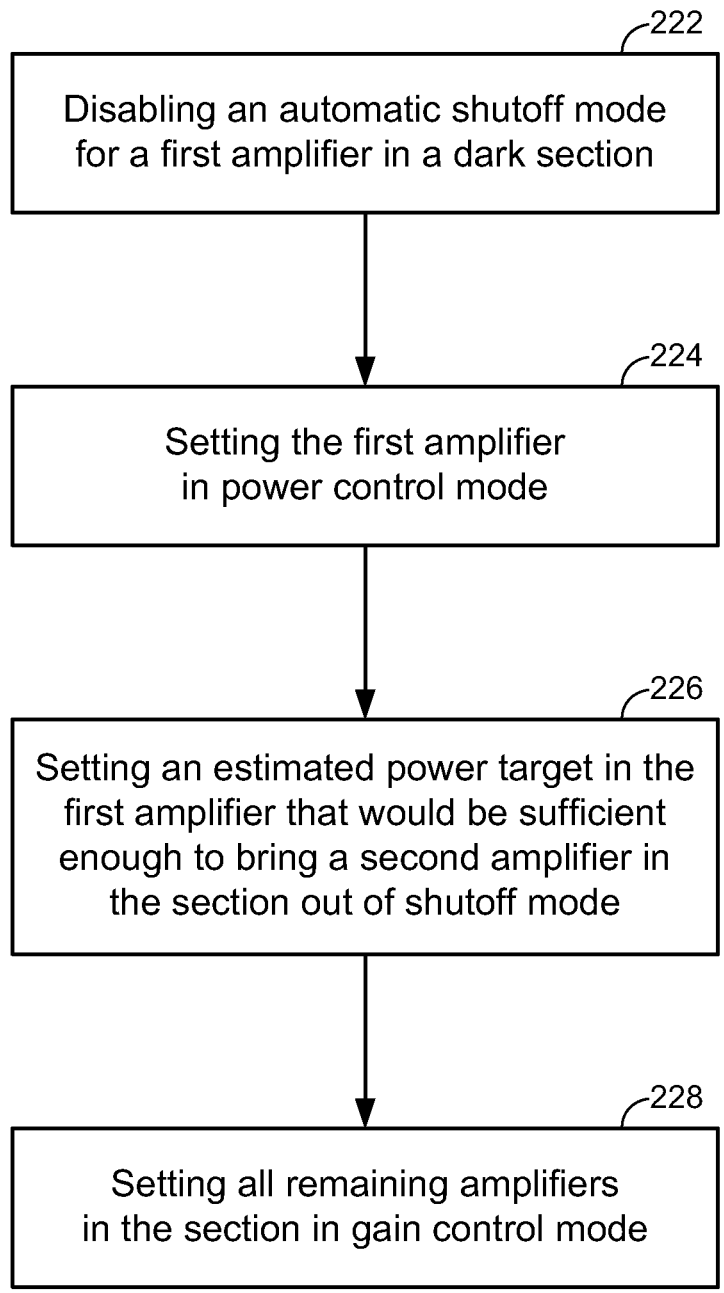
FIG. 2B illustrates a second exemplary flow for detection using dark section conditioning (DSC).

FIG. 2B illustrates a second exemplary flow for detection using DSC. An automatic shutoff mode for a first AMP in a dark section can be disabled (222). Next, the AMP can be set in a power control mode (224). An estimated power target can be set to bring a second AMP in the section out of shutoff mode, wherein the second amplifier is the next amplifier in the set after the first amplifier (226). In some embodiments, a section head optical controller waits a predetermined amount of time in order to allow the first amplifier to achieve its output power target prior to setting all remaining amplifiers in the section in gain control mode. All remaining AMPs in the section can be set in gain control mode (228). In some embodiments, a section head optical controller waits a predetermined amount of time in order to allow the first amplifier to achieve its output power target prior to setting all remaining AMPs in the section in gain control mode. For example, the section head optical controller can wait 5 seconds before setting all remaining AMPs.

In some embodiments, the gain for the remaining AMPs is based on the span loss of the preceding span reported by an optical supervisory channel. In some embodiments, the gain for the remaining AMPs is further modified to allow no gain changes in the event that first traffic channels are added to the section.

Figure 2C:
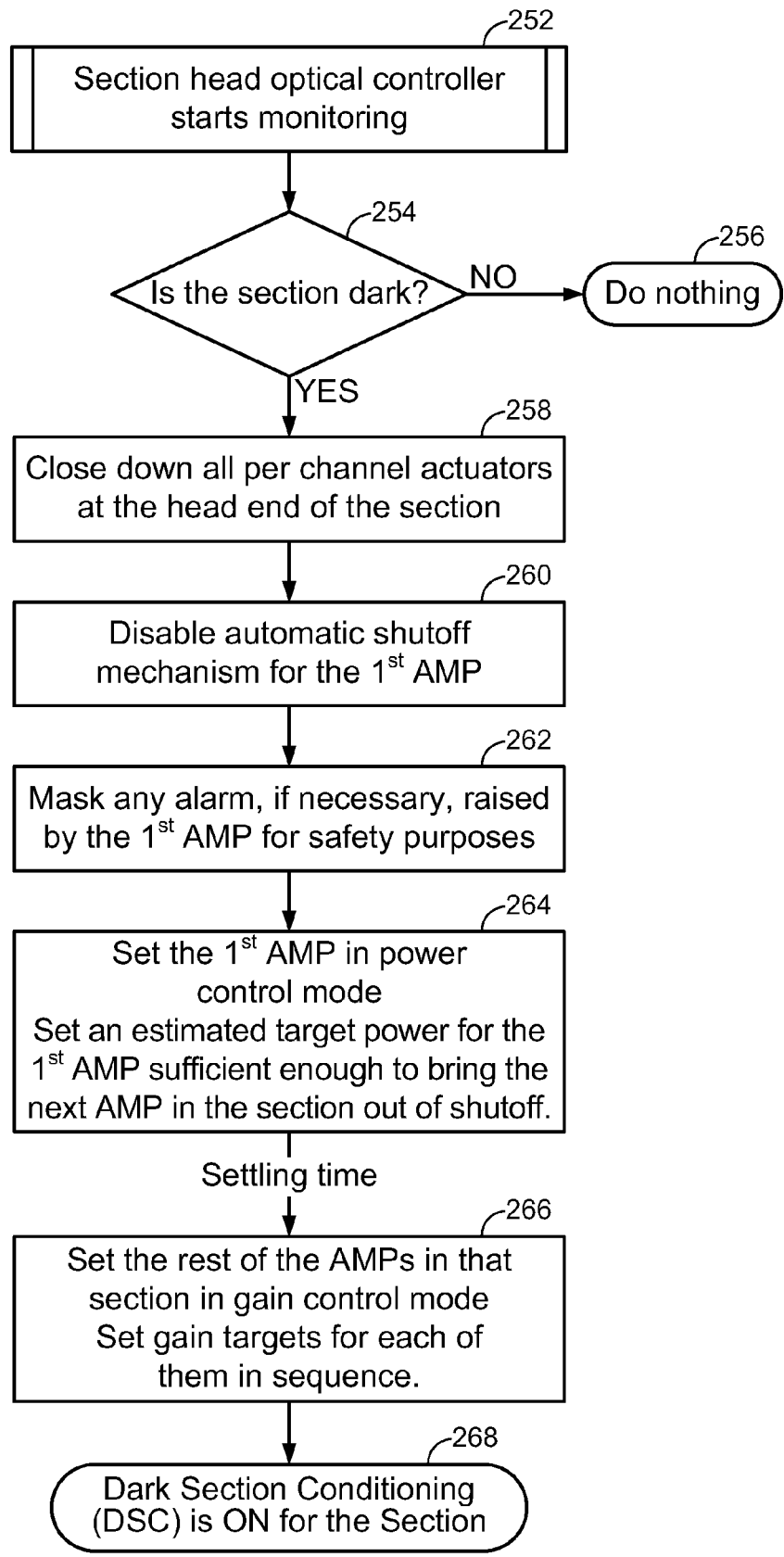
FIG. 2C illustrates another exemplary flow for detection using dark section conditioning (DSC).

FIG. 2C illustrates another exemplary flow for detection using DSC. First, a section head optical controller can begin to monitor a section (252). The condition of the section can be determined, i.e., whether there is an optical signal to the link (254). If the section is not dark, DSC may not be performed (256). If the section is dark, DSC may be performed, and the section head optical controller can close all per channel actuators at the head end OADM node (e.g. closing down the pixels in a wavelength selective switch) or moving the per channel or group mux variable optical attenuators to maximum attenuation) (258). Closing all per channel actuators can prevent any external signals (from local mux or upstream) passing on to the section while the system will be running DSC. To allow signals in the section while in power mode with no input may risk a Q-switch in which the available gain in the energized erbium may all flow into the added signal and produce a high power spike. The high power spike may flow down the line and damage valuable optical equipment.

The section head optical controller can start conditioning the AMPs. The section head optical controller can disable the automatic shutoff mechanism for the first AMP in the section (e.g., by setting the shutoff threshold for the first EDFA to −60 dBm) (260). The section head optical controller can mask a safety alarm if necessary if the first AMP raises one (262). The first AMP can be set in power control mode, and an estimated target power can be set for the AMP so that the AMP can generate amplified spontaneous emissions (ASEs) and maintain a constant target power at its output using AMP internal control loop (264).

The constant target power may be sufficient enough to bring the next AMP in the section out of shutoff. In some embodiments, the section head optical controller can also maintain the safety of the link by keeping all safety mechanisms active.

Next, the section head optical controller can set the rest of the AMPs in gain control mode and can set gain targets for each AMP in sequence (266). It can allow a predetermined settling time (e.g., less than 5 seconds) for each AMP to come out of shutoff before proceeding to next AMP. In some embodiments, the gain for each AMP can be set based on the span loss of the preceding span reported by optical supervisory channel (OSC). In some embodiments, the gain can be further modified or fine tuned such that no gain changes would be necessary when the first traffic channels will be added into the dark section. The DSC can be on for the section (268).

Figure 3A:
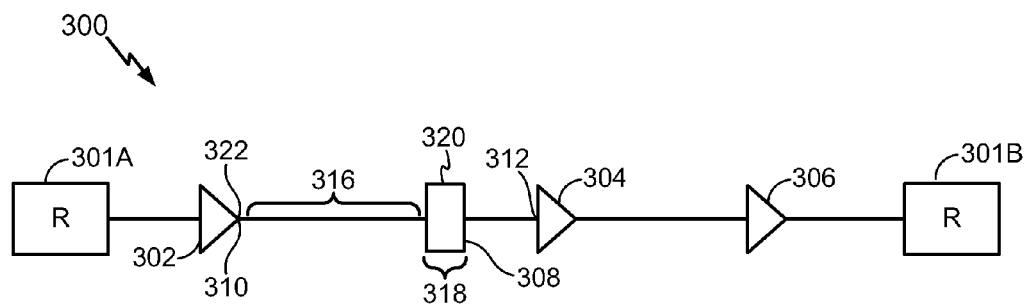
FIG. 3A illustrates an exemplary target power and gain settings for AMPs in an optical section.
Figure 3B:
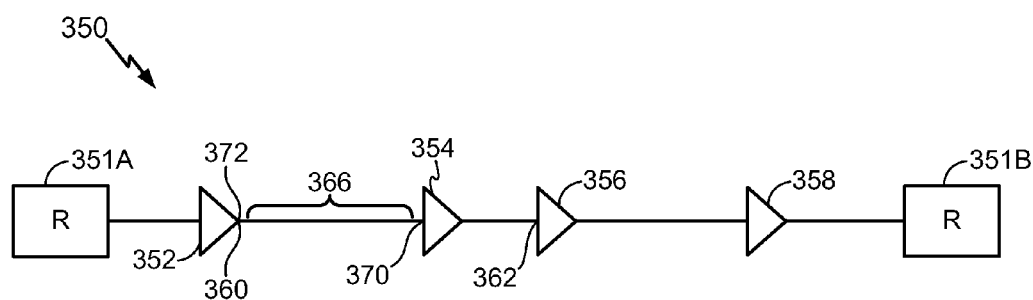
FIG. 3B illustrates another exemplary target power and gain settings for AMPs in an optical section.

FIGS. 3A-3B illustrate exemplary target power and gain settings for AMPs in optical sections 300, 350 between reconfigurable OADMs 301A, 301B and 351A, 351B. Target power 310, 360 can be estimated for the first AMP 302, 352 and target gain can be estimated for the rest of the AMPs 304, 306, 354, 356, 358 in each section 300, 350.

Target Power Calculation for First AMP (AMP Control Mode=Power)

In some embodiments, target power for the first AMP 302, 352 can calculated as follows. The target power 310, 360 can be large enough to bring the next AMP 304, 354 in the section 300, 350 out of shutoff or loss of signal (LOS) state 312, 362. The target power 310, 360 may not be set too low either beyond the AMP minimum output power specification, in case span loss 316, 366 is too low. The first AMP target power 310, 360 may not be set at the maximum achievable target power limit and can be kept low enough in order to avoid any possibility of damaging the AMP circuit pack due to erbium concentration issues in case of accidental optical signal flow.

In some embodiments, the target power for the first AMP can be set as follows:

$$\text{Estimated\_Target\_Power\_1st\_AMP} =$$
$$\text{Min}[\text{Max}\{\text{Next\_AMP\_Input\_LOS} + \text{Threshold(e.g. 3 dB)} +$$
$$\text{Remote\_OSC\_Span\_Loss}, \text{Output\_LOS\_1st\_AMP} +$$
$$\text{Threshold(e.g. 3 dB)}\}, \text{Max\_DSC\_Power\_Limit}]$$
$$\text{Max\_DSC\_Power\_Limit} = \text{Next\_AMP\_Shutoff\_Threshold} -$$
$$\text{Max\_OSC\_Supported\_Span\_Loss}$$
$$\text{Max\_DSC\_Power\_Limit} \ll \text{Max\_Output\_Power\_1st\_AMP}$$

In FIGS. 3A-3B, Next_AMP_Input_LOS 312, 362 stands for the loss of signal threshold for the next available in the section beyond which the next AMP 304, 354 can either shutoff or may not be able to operate in the proper gain mask range.

Threshold 318 is defined in order to cover additional losses in the line system due to insertion of line interface circuit pack modules 308, or dispersion compensating components. Threshold 318 may be, for example, 3 dB to cover additional losses for line interface modules and connectors.

Remote OSC_Span_Loss 320, 370 can be the span loss reported by the optical supervisory channel (OSC) for that span 320, 370. Output_LOS_1st_AMP 322, 372 can stand for the loss of signal (LOS) threshold for the 1st AMP 302, 352 output. Output_LOS_1st_AMP 322, 372 can also mean the minimum output power that the AMP can operate with. Max_DSC_Power_Limit can define the maximum target power that can be provisioned for the 1st AMP 302, 352 and is derived from the maximum span loss supported by the optical supervisory channel, and the next AMP's input LOS state 312, 362 (or shutoff) threshold level.

Target Gain Calculation for All the Rest of the AMPs (AMP Control Mode=Gain)

In order to calculate the target gain for all the subsequent AMPs in the section, the target gain settings can reflect link budget for the span. For example, target gains can be further modified to set to a value that will be closer to a target gain settings when the first set of traffic channels will be added to the link. If the system head optical controller moves from Dark Section Conditioning (DSC) to a first set of channel add, minimal adjustments may be required for the AMP gain settings that, in turn, can reduce the overall service turn up time over dark section. Such service turn up time for 'dark' sections can be reduced from (W+N*X) to approximately (W+1*X) where W is the wait time for doing channel conditioning in an OADM node, N is the number of amplifiers within that section in that direction, and X is the wait time that needs to be allocated for each amplifier to come out of shutoff and to achieve the target gain level during dark add time frame.

For example, the target gain for the rest of the AMPs in the line section can be estimated as below:

Estimated_Target_Gain =
    Max[Min_Gain, Min{Upstream_Output_Pwr − Local_Input_Pwr +
        Local_AMP_PerChannel_Peak_Target −
            Upstream_AMP_PerChannel_Peak_Target, Max_Gain}]

In some embodiments, Min_Gain and Max_Gain refer to the minimum and maximum possible gain allowed by AMP specification or gain mask respectively. Local_Input_Pwr can be the total input power reported on the AMP itself where target gain is supposed to be set. Upstream_Output_Pwr can be the output power reported by the preceding AMP in the section. Some embodiments may include a Local_AMP_PerChannel_Peak_Target, which can refer to the per channel launch power on that AMP with 0 dB additional OSNR bias. Some embodiments can include an Upstream_AMP_PerChannel_Peak_Target, which refers to the per channel launch power on the preceding AMP in the link with 0 dB additional OSNR bias.

Figure 4:
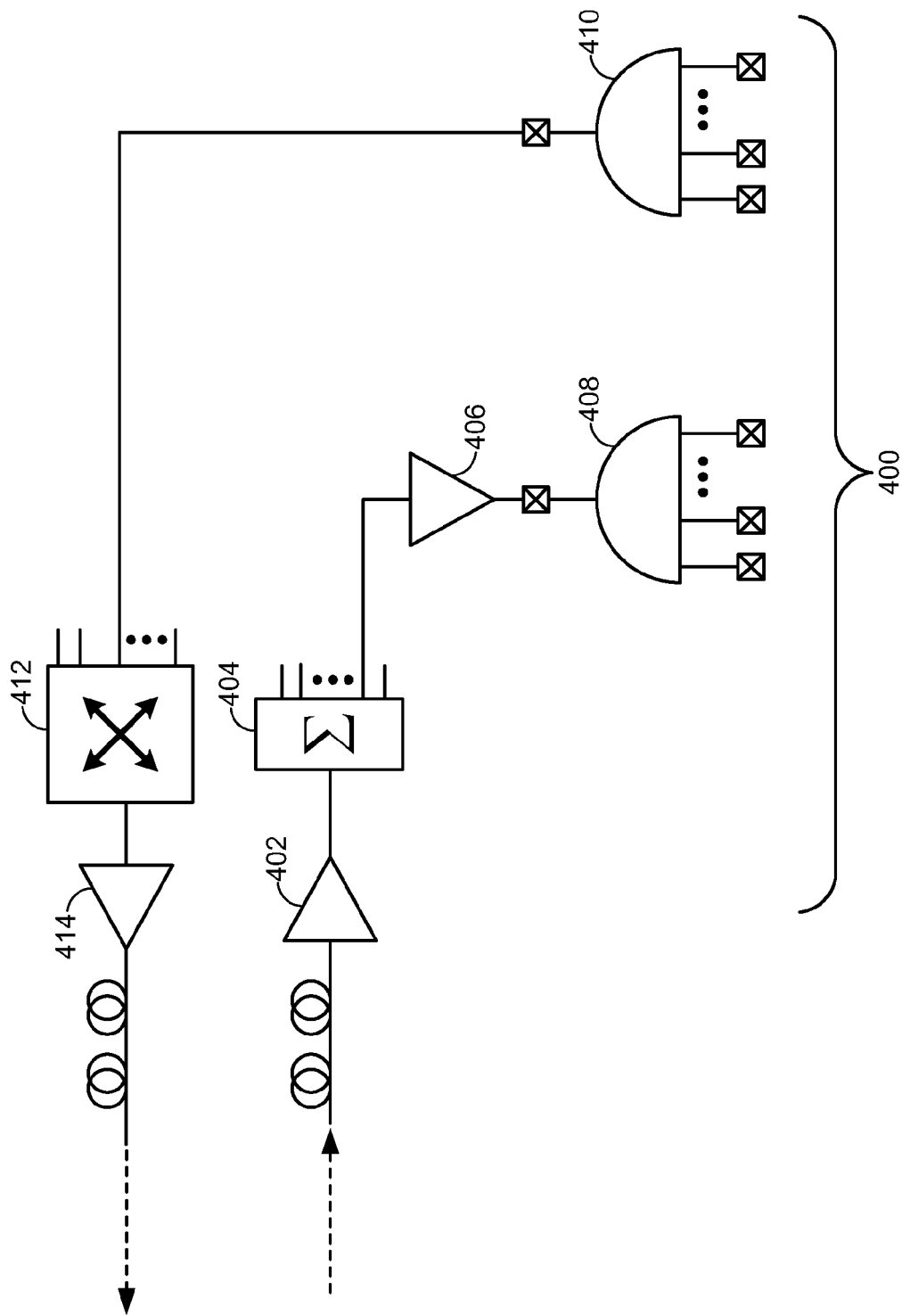
FIG. 4 illustrates exemplary nodal architecture with drop AMP provisioned for demux drops.

FIG. 4 illustrates exemplary nodal architecture of an optical add drop multiplexer (OADM) node 400 with drop AMPs 406 provisioned for demux drops. The node 400 includes a pre-AMP 402 before an OADM demultiplexer (Demux) 404. The Demux 404 can send a signal to a drop AMP 406 before channel demux drops 408. If there are any drop AMPs 406 available before the channel demux drops 408 in order to cover for the demux path insertion losses, there will be no need to take any additional measures for drop AMPs 406 available before the channel demux drops 408. The drop AMPs 406 can be left in gain control mode with minimum achievable target gain specified, and they will come out of shutoff automatically after the last pre-AMP 402 on the section coming out of shutoff assuming it is a broadcast and select based architecture for the node 400. A similar approach can also be taken for a route and select based OADM architecture. Also shown in FIG. 4 is a channel multiplexer add 410, an OADM multiplexer 412, and a post-AMP 414.

Figure 5:
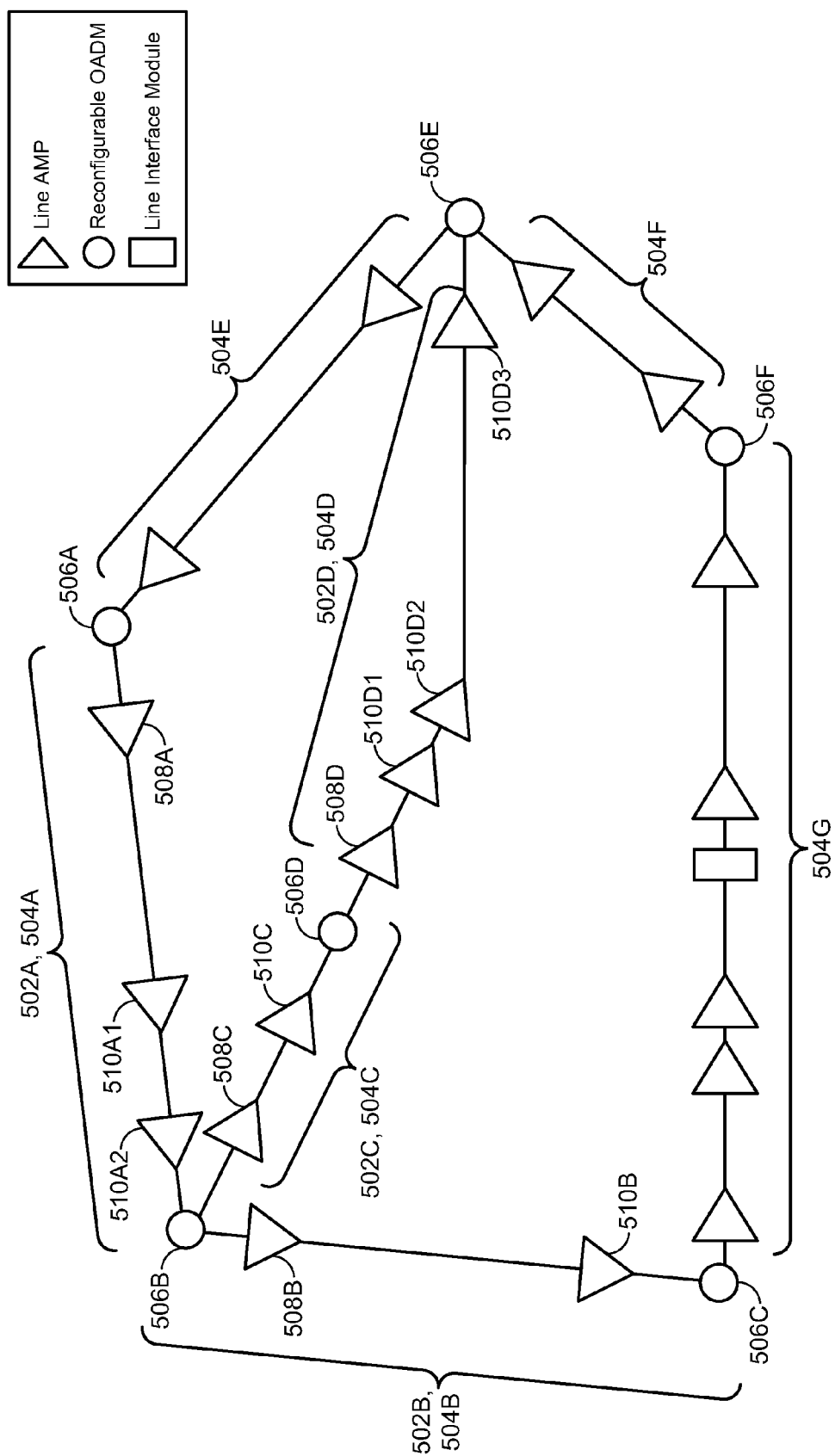
FIG. 5 illustrates an exemplary network with channel fill and dark sections.

FIG. 5 shows a typical mesh network with dark sections 502A-D available in many segments 504A-G of the network. The proposed DSC method can be enabled in each of the dark sections 502A-D, and that should not impact any of the in-service traffic running in all other sections 504E-G. The OADM blocks 506A-F at the ingress of each dark section 502A-D should be able to isolate or block the lights coming from upstream sections that will prevent damaging any AMP circuit packs running in DSC while at the same time, any noise generated by DSC will remain confined within the dark section 502A-D, thus not disrupting traffic in downstream. As shown in FIG. 5, DSC may set a post-AMP 508A-D in power mode running at specified target power and set all other subsequent AMPs 510A1-D3 in gain mode setting the target gain for each AMP 510A1-D3.

In some embodiments, DSC can be used with optical links with Raman amplifiers (AMPs). Raman AMPs may not be used in isolation and are sometimes paired with a non-Raman AMP. The non-Raman AMPs can be used as the source for the DSC mechanism. DSC can operate with Raman links as well as proper communication links established over the Raman span so that the section head controller can bring up the Raman AMPs out of their shutoff state. The controller may have to readjust the gain of the Raman pumps as part of DSC mechanism if that option is available.

DSC can be implemented remotely in multiple end-to-end connected fiber spans in parallel. The control plan can avoid enrolling traffic on a faulty link. DSC can detect a fiber cut event within an optical link using Automatic Laser Shutoff (ALSO), which checks for AMP shutoff and optical supervisory channel loss of frame for that specific link.

Figure 6:
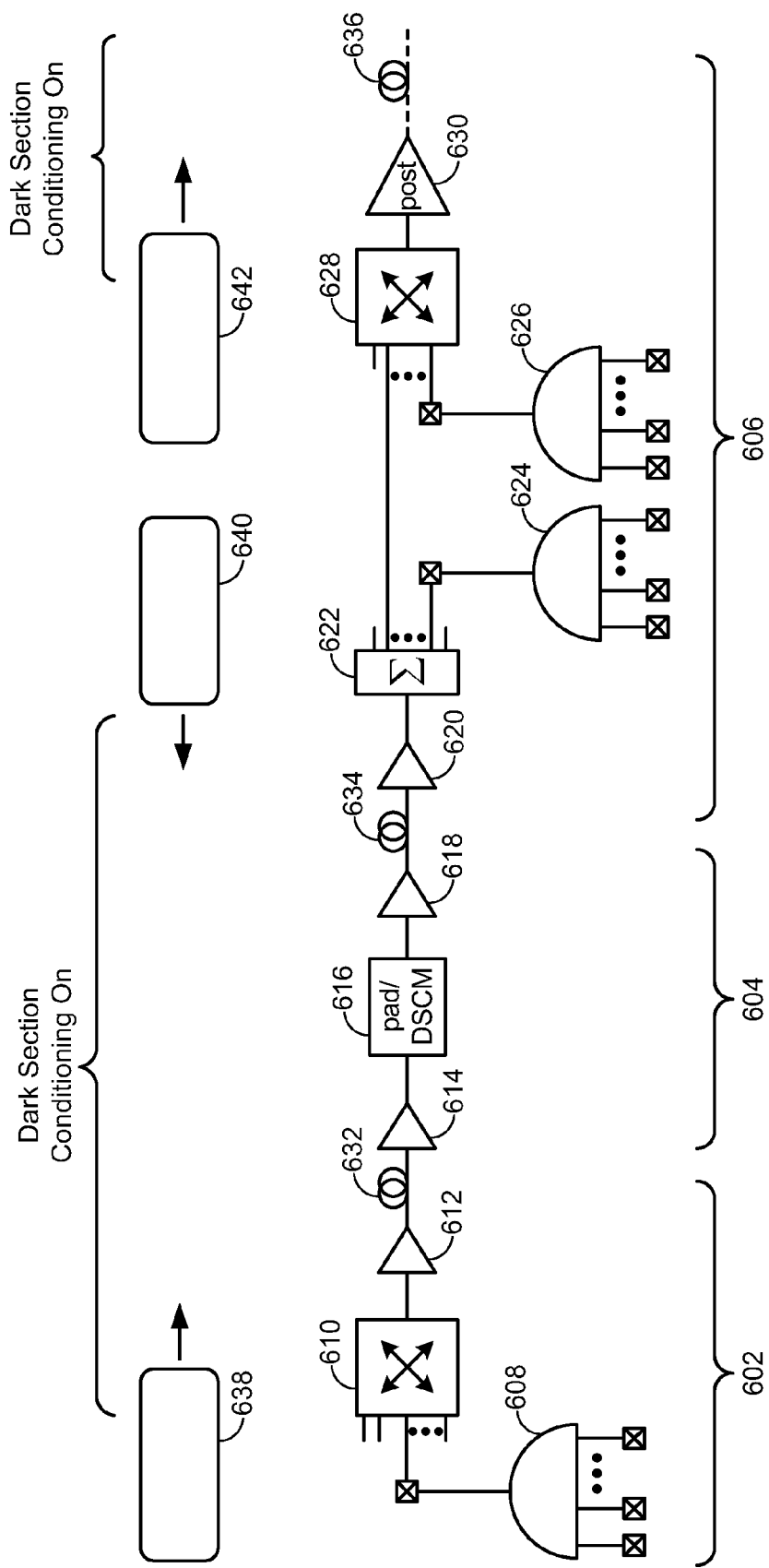
FIG. 6 illustrates exemplary alarm and fault points for detection using dark section conditioning (DSC).

As shown in FIG. 6, the advantages of DSC in a dark section can be expanded beyond one section. In some embodiments, alarms and fault points can be detected in a non-traffic carrying dark section using DSC mechanism for a typical broadcast and select based network architecture. For example, in FIG. 6, node 602, node 604, and node 606 can be monitored using DSC. In FIG. 6, node 602 includes a channel mux add 608, an OADM multiplexer 610, and a post-AMP 612. Node 604 includes a pre-AMP 614, a variable or fixed optical attenuator (pad) or a dispersion shifted compensation module (DSCM) 616, and a post-AMP 618. Node 606 includes a pre-AMP 620, an OADM demultiplexer 622, a channel demux drop 624, a channel mux add 626, an OADM multiplexer 628, and a post-AMP 630. Shown in FIG. 6 is a first fiber span 632 after node 602, a second fiber span 634 after node 604, and a third fiber span 636 after node 606. Node 602 also includes a first shelf processor sectional optical controller 638. Node 604 includes a second shelf processor sectional optical controller 640. Node 606 includes a third shelf processor sectional optical controller 642.

Numerous alarm and fault points can be detected using DSC in multiple-node configurations. For example, at a post-AMP 612 of node 602, the post-AMP 612 can receive automatic power reduction (APR), shutoff, or loss of signal (LOS) for the AMPs. High back reflection on AMP-output ports can occur. Prior to the pre-AMP 614 of node 604, there can be a line fiber cut (e.g., an Optical Line Fail), or a high received span loss between inter-node adjacencies (e.g., nodes 602 and 604). There can also be an intra-node fiber disjoint, including high fiber loss (HFL) detection, between the Line Interface Modules (e.g., AMPs); Line Interface Modules to Wavelength Select Switch (WSS) (e.g., pre-AMP 620 to OADM demultiplexer 622); and WSS to WSS (OADM demux 622 to OADM multiplexer 628). A circuit pack failure of any active components in an optical fiber can also be detected (e.g., WSS, AMP, Optical Power Monitors, optical supervisory channels, and shelf-processors of any node).

In some embodiments, DSC can detect the event of fiber cut within an optical link using system-defined Automatic Line Shutoff (ALSO) technique that can check for AMP shutoff and OSC loss of frame for that specific link. In some cases, line AMPs can have built-in back reflector photodiodes on the output port that can detect any amount of back reflection coming to the port. If the amount of back reflection is too high, the AMP output power can be reduced, for example, with automatic power reduction (APR). DSC can detect APR conditions leveraging built-in measurement points while the system is fully active, functional, and ready to enroll traffic. Unlike optical time-domain reflectometer (OTDR) or external measuring equipment, DSC can be implemented without fiber disjoint or using any external equipment.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for optical dark section conditioning, comprising:
responsive to determining that a section is dark, wherein a dark section comprises connected fiber spans that are functional with no traffic carrying channels present, generating at least one of a broadband noise and a signal at a head end of the section, by a first module of the section; and
operating all other modules of the section in gain control mode.

2. The method of claim 1, further comprising closing all per channel actuators at a head end optical add drop multiplexer (OADM) node.

3. The method of claim 2, further comprising closing down pixels in a wavelength selective switch.

4. The method of claim 2, further comprising changing a per channel or a group multiplexer variable optical attenuator to an approximate maximum attenuation.

5. The method of claim 1, further comprising masking an alarm raised by a first amplifier at the head of the section.

6. The method of claim 1, wherein the target gain for the other modules is based on a span loss of a preceding span, as determined by an optical supervisory channel.

7. The method of claim 1, wherein the gain for the other modules is substantially based on prior results.

8. The method of claim 1, further comprising setting gain targets for all modules in gain control mode.

9. The method of claim 1, wherein a section head optical controller waits a predetermined amount of time in order to allow a first amplifier to achieve its output power target prior to setting the other modules in the section in gain control mode.

10. An apparatus for optical dark section conditioning, comprising:
 logic configured to, responsive to a determination that a section is dark, wherein a dark section comprises connected fiber spans that are functional with no traffic carrying channels present, generate at least one of a broadband noise and a signal at a head end of the section by a first module of the section; and
 logic configured to operate all other modules of the section in gain control mode.

11. The apparatus of claim 10, further comprising logic configured to close all per channel actuators at a head end optical add drop multiplexer node.

12. The apparatus of claim 11, further comprising logic configured to close down pixels in a wavelength selective switch.

13. The apparatus of claim 11, further comprising logic configured to change a per channel or a group multiplexer variable optical attenuator to an approximate maximum attenuation.

14. The apparatus of claim 10, further comprising logic configured to mask an alarm raised by the first amplifier.

15. The apparatus of claim 10, wherein the target gain for the other modules is based on a span loss of a preceding span reported by an optical supervisory channel.

16. The apparatus of claim 10, wherein the gain for the other modules is substantially based on prior results.

17. The apparatus of claim 10, further comprising logic configured to set gain targets for all modules in gain control mode.

18. The apparatus of claim 10, wherein the section head optical controller waits a predetermined amount of time in order to allow a first amplifier to achieve its output power target prior to setting all other modules in the section in gain control mode.

19. An apparatus for optical dark section conditioning, comprising:
 a processor configured to
 responsive to a determination that a section is dark, wherein a dark section comprises connected fiber spans that are functional with no traffic carrying channels present, generate at least one of a broadband noise and a signal at a head end of the section by a first module of the section; and
 cause all other modules of the section to operate in gain control mode.

20. The apparatus of claim 19, wherein the processor is configured to perform optical dark section conditioning on more than one dark section.

21. The apparatus of claim 20, wherein the more than one dark section comprises at least one of the following:
 a route and select based network architecture and a broadcast and select-based architecture.

22. The apparatus of claim 20, wherein the processor is configured to perform optical dark section conditioning on a section that comprises at least one Raman amplifier.

23. The apparatus of claim 19, wherein at least one of the modules has a back-reflector photodiode on an output port to detect back-reflection coming into the port.

24. The apparatus of claim 19, wherein the processor is configured to reduce output power in order not to damage the modules.

25. A non-transitory computer-readable medium storing instructions executable by a processor for optical dark section conditioning, comprising:
 at least one instruction to generate, responsive to a determination that a section is dark, wherein a dark section comprises connected fiber spans that are functional with no traffic carrying channels present, at least one of a broadband noise and a signal at a head end of the section by a first module of the section; and
 at least one instruction to operate all other modules of the section in gain control mode.

26. The apparatus non-transitory computer-readable medium of claim 25, further comprising at least one instruction to perform optical dark section conditioning on more than one dark section.

27. The non-transitory computer-readable medium of claim 25, wherein the more than one dark section comprises at least one of the following:
 a route and select based network architecture and a broadcast and select-based architecture.

28. The non-transitory computer-readable medium of claim 25, performs further comprising at least one instruction to perform optical dark section conditioning on a section that comprises at least one Raman amplifier.

29. The non-transitory computer-readable medium of claim 25, wherein at least one of the modules has a back-reflector photodiode on an output port to detect back-reflection coming into the port.

30. The non-transitory computer-readable medium of claim 25, further comprising at least one instruction to reduce output power in order not to damage the modules.

31. A method for optical dark section conditioning, comprising:
 disabling an automatic shutoff mode for a first amplifier in a dark section comprising connected fiber spans that are functional with no traffic carrying channels present;
 setting the first amplifier in power control mode;
 setting an estimated power target to bring a second amplifier in the section out of shutoff mode, wherein the second amplifier is the next amplifier in the set after the first amplifier; and
 setting all remaining amplifiers in the section in gain control mode.

32. The method of claim 1, further comprising detecting a fault in the section while the section is dark based on the optical dark section conditioning.

33. The apparatus of claim 10, further comprising logic configured to detect a fault in the section while the section is dark based on the optical dark section conditioning.

* * * * *